US009558292B2

(12) United States Patent
Kim (10) Patent No.: US 9,558,292 B2
(45) Date of Patent: Jan. 31, 2017

(54) DISTILLING POPULAR INFORMATION OF A WEB PAGE

(75) Inventor: Seungil Kim, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 580 days.

(21) Appl. No.: 13/577,411

(22) PCT Filed: Apr. 10, 2012

(86) PCT No.: PCT/US2012/032925
§ 371 (c)(1),
(2), (4) Date: Aug. 6, 2012

(87) PCT Pub. No.: WO2013/154542
PCT Pub. Date: Oct. 17, 2013

(65) Prior Publication Data
US 2013/0268838 A1    Oct. 10, 2013

(51) Int. Cl.
G06F 17/00        (2006.01)
G06F 17/30        (2006.01)
(52) U.S. Cl.
CPC ..... *G06F 17/30905* (2013.01); *G06F 17/3053* (2013.01); *G06F 17/30463* (2013.01); *G06F 17/30861* (2013.01); *G06F 17/30864* (2013.01); *G06F 17/30867* (2013.01)
(58) Field of Classification Search
CPC ............... G06F 17/30905; G06F 17/30463; G06F 17/30864; G06F 17/30867; G06F 17/3053; G06F 17/30861
USPC ....... 715/234, 713, 721, 722, 723, 726, 727, 715/728; 707/706–708
See application file for complete search history.

(56) References Cited

U.S. PATENT DOCUMENTS

| 8,918,867 B1* | 12/2014 | Salour ................. G06F 21/6245 726/22 |
| 2005/0066335 A1* | 3/2005 | Aarts ...................... G06F 9/543 719/316 |
| 2005/0222981 A1 | 10/2005 | Lawrence et al. |
| 2005/0234848 A1* | 10/2005 | Lawrence et al. ................ 707/1 |
| 2007/0100824 A1* | 5/2007 | Richardson ....... G06F 17/30864 |
| 2007/0112760 A1* | 5/2007 | Chea ................. G06F 17/30719 |

(Continued)

FOREIGN PATENT DOCUMENTS

CN      101894157 A      11/2010

OTHER PUBLICATIONS

Patrick J. Lynch and Sarah Horton, "Search Engine Optimization", Mar. 2, 2009, Web Style Guide 3rd Edition, pp. 10.*

(Continued)

*Primary Examiner* — Chau Nguyen
(74) *Attorney, Agent, or Firm* — Brundidge & Stanger, P.C.

(57) ABSTRACT

Implementations and techniques for distilling popular parts of a web page are generally disclosed. In some examples the techniques include receiving, at a computing device, an indication of a clipboard operation on the web page, responsive to the received indication, obtaining information corresponding to data stored as content of the clipboard operation, storing the obtained information, determining a number of times the obtained information is stored, and setting a popularity level for the obtained information based, at least in part, on the determined number of times.

22 Claims, 5 Drawing Sheets

(56) References Cited

U.S. PATENT DOCUMENTS

| | | | |
|---|---|---|---|
| 2007/0282797 A1 | 12/2007 | Wang et al. | |
| 2008/0209487 A1* | 8/2008 | Osann | H04N 21/4122 725/109 |
| 2008/0313147 A1 | 12/2008 | Svore et al. | |
| 2009/0240691 A1* | 9/2009 | Yano et al. | 715/700 |
| 2009/0265342 A1* | 10/2009 | Shuster | G06F 17/30864 |
| 2009/0287657 A1* | 11/2009 | Bennett | 707/3 |
| 2010/0070351 A1* | 3/2010 | Kang | 715/234 |
| 2010/0293034 A1* | 11/2010 | Olejniczak | G06F 17/30864 705/14.45 |
| 2011/0087966 A1 | 4/2011 | Leviathan | |
| 2011/0126092 A1* | 5/2011 | Harris | 715/256 |
| 2011/0218946 A1* | 9/2011 | Stern et al. | 706/12 |
| 2011/0320443 A1* | 12/2011 | Ray et al. | 707/723 |
| 2013/0013400 A1* | 1/2013 | Kim | G06Q 30/0241 705/14.49 |
| 2013/0013401 A1* | 1/2013 | Kim | G06Q 30/0241 705/14.49 |
| 2013/0013987 A1* | 1/2013 | Kim | G06F 17/30882 715/201 |
| 2014/0006931 A1* | 1/2014 | Pettitt | H04L 67/26 715/234 |

OTHER PUBLICATIONS

"Enable Copy, Cut, and Paste operations in your browser", University of Wisconsin—Stout, Nov. 11, 2010, pp. 3.*

"Copy and paste multiple items by using the Office Clipboard", Nov. 8, 2006, Microsoft, pp. 19.*

Stolee et al., "Revealing the Copy and Paste Habits of End Users", 2009, Department of Computer Science and Engineering, University of Nebraska—Lincoln, Lincoln, NE, U.S.A., pp. 8.*

Fujima, J. et al., Clip, connect, clone: combining application elements to build custom interfaces for information access, Proceedings of the 17th Annual ACM Symposium on User Interface Software and Technology (UIST), Oct. 2004, pp. 175-184, USA.

United States Patent and Trademark Office, International Search Report and Written Opinion of the International Searching Authority for PCT/US2012/032925, mailed on Jun. 22, 2012, USA.

* cited by examiner

400 Computer Program Product

402 Signal Bearing Medium

404 A machine readable non-transitory medium having stored therein instructions that, when executed by one or more processors, operatively enable a memory control module to:

receive an indication of a clipboard operation on a web page;

responsive to the received indication, obtain information corresponding to data stored as content of the clipboard operation;

store the obtained information;

determine a number of times the obtained information is stored; and     set a popularity level for the obtained information based, at least in part, on the determined number of times.

| 406 Computer-Readable Medium | 408 Recordable Medium | 410 Communications Medium |
|---|---|---|

DISTILLING POPULAR INFORMATION OF A WEB PAGE

CROSS-REFERENCE TO RELATED APPLICATION

This Application is the U.S. National Stage filing under 35 U.S.C. §371 of PCT Application Ser. No. PCT/US2012/032925 filed on Apr. 10, 2012. The disclosure of the PCT Application is hereby incorporated herein by reference in its entirety.

BACKGROUND

Unless otherwise indicated herein, the approaches described in this section are not prior art to the claims in this application and are not admitted to be prior art by inclusion in this section.

A large amount of information may be available on the Internet. However, knowing which information may be important or of interest to a particular user may be difficult. For example, a typical web page may contain many articles about many things, some of which may not necessarily be of interest to the user. The user may have navigated to the web page to view a particular article of interest, but instead, articles not related to the article of interest may inundate the user.

SUMMARY

The present disclosure describes various example methods for distilling popular information of a web page. The example methods may include receiving, at a computing device, an indication of a clipboard operation on the web page, and responsive to the received indication of the clipboard operation, obtaining information corresponding to data stored as content of the clipboard operation. Additionally, the example methods may include storing the obtained information, determining a number of times the obtained information is stored, and setting a popularity level for the obtained information based, at least in part, on the determined number of times.

The present disclosure also describes various example computer program products. In some examples, the computer program product may include a machine readable non-transitory medium having stored therein instructions that, when executed, cause a computing device to facilitate distilling popular information of a web page. Example machine readable non-transitory media may have stored therein instructions that, when executed, cause the computing device to receive an indication of a clipboard operation on a web page, and responsive to the received indication, obtain information corresponding to data stored as content of the clipboard operation. The instructions may also cause the computing device to store the obtained information, determine a number of times the obtained information is stored, and set a popularity level for the obtained information based, at least in part, on the determined number of times.

The present disclosure additionally describes example computing systems. The example computing systems may include a processor and a machine readable medium communicatively coupled to the processor and having stored therein instructions that, when executed by the processor, cause the computing system to receive an indication of a clipboard operation on a web page, and responsive to the received indication, obtain information corresponding to data stored as content of the clipboard operation. The instructions may also cause the computing device to store the obtained information, determine a number of times the obtained information is stored, and set a popularity level for the obtained information based, at least in part, on the determined number of times.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art that claimed subject matter may be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and/or computer program products related to distilling popular information of a web page.

In general, when a user navigates to a web page, the web page may have a large amount of information, some of which may not be of interest to the user. For example, a user may have received a link to a news related web page having a popular article. The popular article may be an article being disseminated in a community, such as a social networking community. The user may have received the link via some form of electronic communication media such as email. When the user navigates to the news related web page (e.g., by clicking on the link), the user may need to search for the popular article on the web page among several other articles. Accordingly, as contemplated in the present disclosure, the embodiments disclosed herein may provide for the user being presented with the popular article on the web page without the user having to figure out or determine which of the articles presented on the web page may be the popular article (i.e., the article the user is interested in).

In some examples, a computing device may determine a popularity level of an article based at least, in part, on an activity or activities associated with the article. By way of example, a popular article may be passed around from user to user in some form or another. One method may be by cutting and pasting the popular article and emailing the pasted article. Another method may be by copying and pasting a link to the popular article and texting the pasted link. As the activity associated with the article increases, so may its popularity level. Once the popularity level reaches a certain point, a summary of the popular article may be generated. Referring to the example of the popular article on the news related web page, when the user navigates to the news related web page, the user may be presented with the summary of the popular article reducing the need for the user to search the web page for the popular article. The popular article of the web page may be distilled for the convenience of the user, and as a result, information contained in the popular article may be presented as the summary of the popular article.

Figure 1:
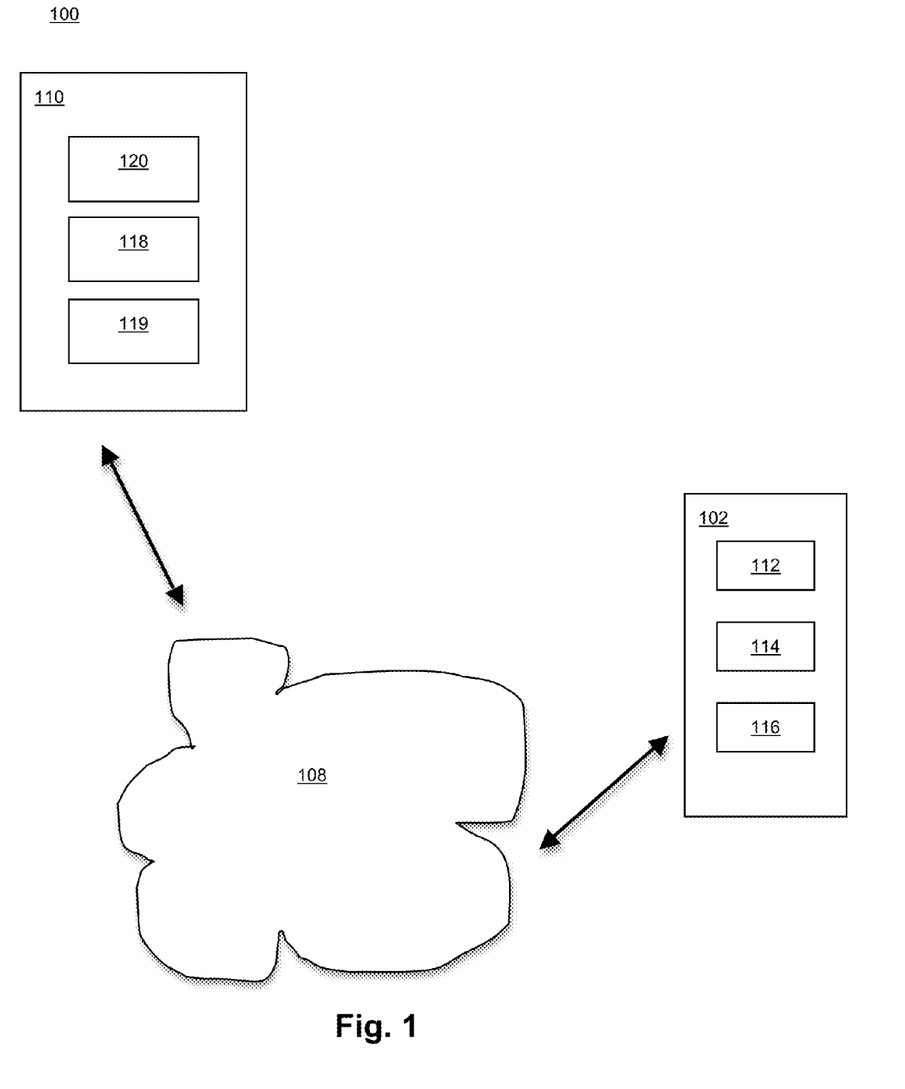
FIG. 1 illustrates an example communication system, arranged in accordance with at least some embodiments described herein.

Turning now to the figures, FIG. 1 illustrates an example communication system 100, arranged in accordance with at least some embodiments described herein. The communication system 100 may include a client device 102. The client device 102 may be communicatively coupled to an internet 108. Additionally, the communication system 100 may include a server type computing device 110. The server type computing device 110 may also be communicatively coupled to the Internet 108. As will be described in detail below, the communication system 100 may facilitate distilling of popular information of a web page in accordance with various embodiments.

It should be appreciated that the client device 102 may be any type of client device such as, but not limited to, a laptop computer, a desktop computer, a mobile phone, a smart phone, a server, etc. Additionally, the client device 102, may include capabilities for interfacing with the user such as, but not limited to a Graphical User Interface (GUI) to facilitate viewing of and interacting with the web page by the user. The server type computing device 110 may be any type of server type device and may represent a single server type computing device, a server rack with one or more server type computing devices, a server farm, or a part of a ubiquitous computing environment such as, but not limited to, cloud computing environments. The internet 108 may be any type of communication network such as, but not limited to, a world wide web, a local area network (LAN), a wireless local area network (WLAN), or any combination thereof. Further, the internet 108 may include wireless and/or wired communication networks.

As depicted in FIG. 1, the client device 102 may be shown in further detail to include a detect clipboard operation module 112, a store clipboard data module 114, and a transmit stored clipboard data module 116. The detect clipboard operation module 112 may detect a clipboard operation such as, but not limited to, a copy operation of a popular article on a web page by a user (not shown) of the client device 102. The store clipboard data module 114 may store the clipboard data corresponding to the detected clipboard operation from the detect clipboard operation module 112. The transmit stored clipboard data module 116 may transmit the stored clipboard data corresponding to the detected clipboard operation to the server type computing device 110 via the internet 108.

As depicted in FIG. 1, the detect clipboard operation module 112, the store clipboard data module 114, and the transmit stored clipboard data module 116 may be configured or implemented as separate modules, but it should be appreciated that the detect clipboard operation module 112, the store clipboard data module 114, and the transmit stored clipboard data module 116 may be of a wide variety of configurations such as, but not limited to, a single module and/or any combination thereof, and accordingly, the claimed subject matter is not limited in these respects.

The server type computing device 110 may include a machine readable medium 118, a storage medium 119, and a processor 120, in accordance with at least one or more embodiments. The machine readable medium 118 may include instructions that, when executed by the processor 120, may cause the server type computing device 110 to receive an indication of a clipboard operation on a web page such as, but not limited to, the stored clipboard data corresponding to the detected clipboard operation at the client device 102. Responsive to the received indication, the server type computing device 110 may obtain information corresponding to data stored as content of the clipboard operation at the client device 102. The obtained information corresponding to data stored as content of the clipboard operation may include any type of information indicating a type of information that was stored as a result of the clipboard operation (e.g., a link to the web page having the article, a portion of text of the article, an image related to the article, full text of the article, and so forth). Because the clipboard operation may have been performed on the web page, the obtained information may also include information regarding a location of the article such as, but not limited to, a uniform resource locator (URL).

The server type computing device 110 may store the obtained information in the storage medium 119. Each time the obtained information is stored in the storage medium 119, the server type computing device 110 may determine a number of times the obtained information is stored in the storage medium 119. Based, at least in part, on the determined number of times the obtained information is stored, the server type computing device 110 may set a popularity level for the obtained information, in accordance with various embodiments of the present disclosure.

For example, the server type computing device 110 may store information several times regarding a popular article from the client device 102 and several other client devices (not shown). As the number of times the information is stored increases, the popularity level of the article may increase as well. At a predetermined number, the server type computing device 110 may determine that the article is popular enough to generate a summary representation of the article. Subsequently, if a client device opens a web page having the popular article among several other articles, the server type computing device 110 may present the summary of the popular article on the opened web page.

In another example, if the user performs a search operation on the internet 108 to find the popular article, but the user searches a subject area of the popular article, the server type computing device 110 may present search results of articles based, at least in part, on the popularity level for the subject area. By way of example, the user may enter a search term for "skiing in Pacific Northwest" into a search engine, and as a result of the search, the search engine may provide a list of links to articles related to skiing in the Pacific Northwest. The first link may be a link to the most popular article about skiing in the Pacific Northwest (e.g., "Mount Hood has a new lift"), and the last link may be a link to the least popular article (e.g., "Crystal Mountain has a new recycling program"). In an example, each of the articles may be determined to be of a popularity level to generate a corresponding summary representation, and accordingly, the user may navigate to one of the articles (e.g., the user may click on the link to "Mount Hood has a new lift") and be presented with a corresponding summary representation for the article. In another example, the user may view a preview of one of the articles and be presented with a corresponding summary representation of the article (e.g., the user may click on a preview icon or may have a cursor hover over the link to "Crystal Mountain has a new recycling program").

It should be appreciated by those skilled in the art that even though the server type computing device 110 may be shown as being communicatively coupled to the Internet 108, and in turn, may be communicatively coupled to the client type device 102, the server type computing device 110 may be a wide variety of server type computing devices such as, but not limited to, ubiquitous server type computing device(s), cloud computing type computing devices/systems, a client type device configured and/or capable of operating as a server type computing device, etc., and accordingly, the claimed subject matter is not limited in these respects. Additionally, the machine readable medium 118 and the storage medium 119 may be shown as separate modules, but it should be appreciated that machine readable medium 118 and the storage medium 119 be of a wide variety of configurations such as, but not limited to, a single module, a component of the processor 120, and/or any combination thereof, and accordingly, the claimed subject matter is not limited in these respects.

As a result, the communication system 100 of FIG. 1 may facilitate distilling popular information of a web page, in accordance with various embodiments of the disclosure.

Figure 2:
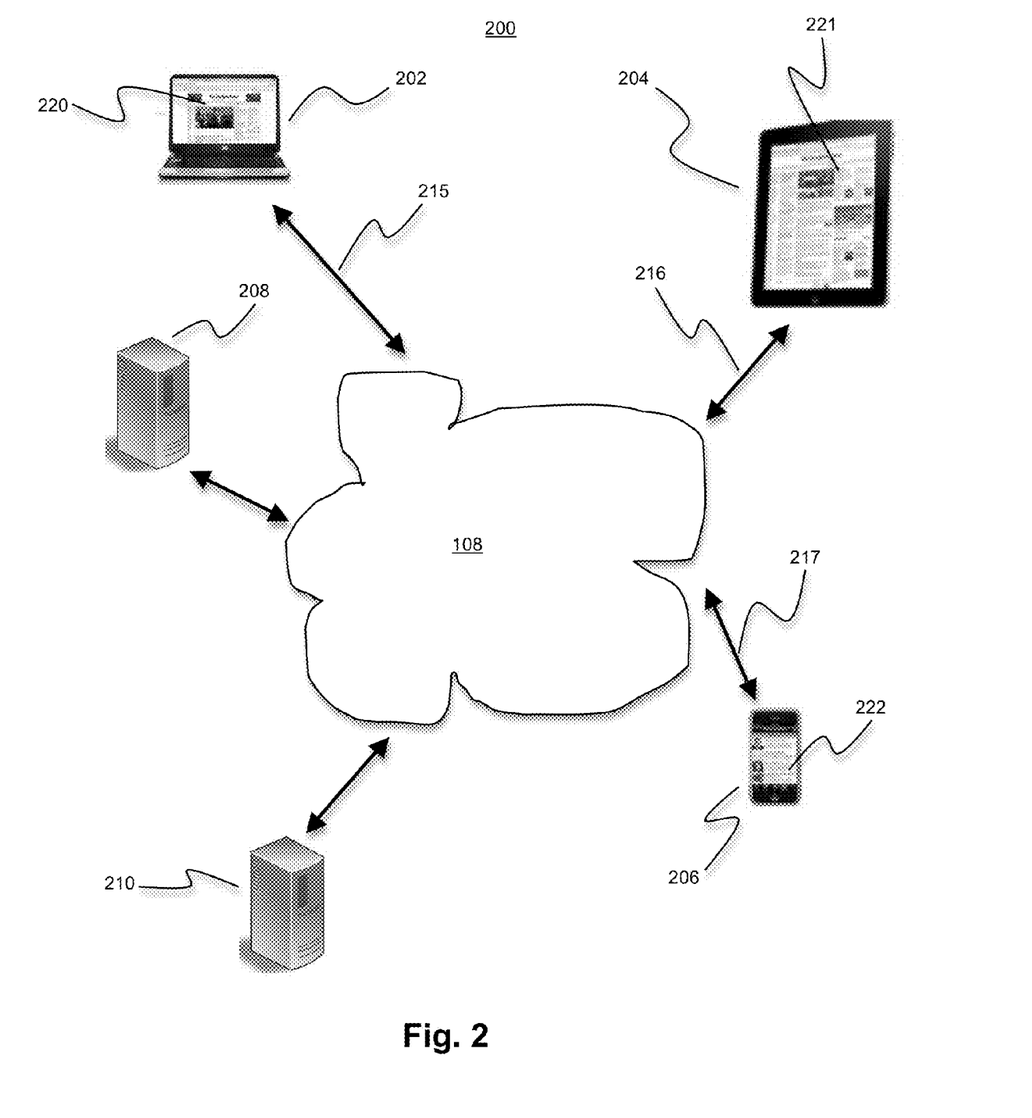
FIG. 2 illustrates another example communication system, arranged in accordance with at least some embodiments described herein.

FIG. 2 illustrates another example communication system 200, arranged in accordance with at least some embodiments described herein. The communication system 200 may include one or more client type computing devices such as, but not limited to, a laptop type computing device 202, a tablet type computing device 204, and a mobile computing device 206. Additionally, the communication system 200 may include a social networking service 208 and a server type computing device service provider 210. The laptop type computing device 202, the tablet type computing device 204, the mobile type computing device 206, the social networking service 208, and the server type computing device service provider 210 may all be communicatively coupled to each other via the internet 108, and together, the communication system 200 may facilitate distilling of a web page.

In FIG. 2, in an example, the server type computing device service provider 210 may receive an indication of a first clipboard operation 215 from the laptop type computing device 202. The first clipboard operation 215 may be a copy operation of a popular article on a web page 220 on the laptop type computing device 202. The first clipboard operation 215 may result in data stored as content of the clipboard operation on the laptop type computing device 202. Responsive to the received indication, the server type computing device service provider 210 may obtain information corresponding to data as content of the first clipboard operation 215, and the obtained information may be stored, as previously described with respect to FIG. 1. The obtained information may include information indicating that the text of article was copied. Additionally, the obtained information may include a URL of the web page 220.

The server type computing device service provider 210 may receive an indication of a second clipboard operation 216 from the tablet type computing device 204. The second clipboard operation 216 may be a copy operation of a link to the popular article on a web page 221 on the tablet type computing device 204. In one example, the web page 220 on the laptop type computing device 202 and the web page 221 on the tablet type computing device 204 may be from the same web site such as, but not limited to, a news related web site.

The second clipboard operation 216 may result in data stored as content of the second clipboard operation 216 on the tablet type computing device 204. Here again, responsive to the received indication, the server type computing device service provider 210 may obtain information corresponding to data as content of the second clipboard operation 216, and the obtained information may be stored. The obtained information may include information indicating that the link to the article was copied, and accordingly, the obtained information may include a URL of the web page 221.

The server type computing device service provider 210 may determine a number of times the obtained information is stored, and set a popularity level for the obtained information based, at least in part, on the determined number of times, in accordance with various embodiments. For the sake of simplicity of describing the subject matter, the number of times the obtained information is stored may be two times (i.e., the first clipboard operation 215 and the second clipboard operation 216). Accordingly, the server type computing device service provider 210 may facilitate generation of a summary representation of the obtained information (i.e., the popular article).

In the example of FIG. 2, the mobile type computing device 206 may transmit a request 217 to open a social networking web page 222 from the social networking service 208 such as a bulletin board type web page having various articles and/or links. When the social networking web page 222 is opened on the mobile device 206, the server type computing device service provider 210 may present the summary representation of the popular article on the mobile device 206. It should be appreciated by one skilled in the art that the mobile computing device 206 may also receive communication such as, but not limited to, an update to an article or a web page, and accordingly, the claimed subject matter is not limited in these respects.

The predetermined number may be any number and may be based on various factors such as, but not limited to viewer related factors. For example, a popular article may be about a social event, and the predetermined number may be based, at least in part, an audience size for a web page corresponding to the social event. In one example, a web page may be of an international section of a news related web site, which may correspond to a predetermined number of 1000 clipboard operations regarding an article about a demonstration in France. In another example, a web page may be of a chess club section of a Junior High school web site, which may correspond to a predetermined number of 10 clipboard operations regarding an article about an international chess tournament. Accordingly, the predetermined number may be any number, and the claimed subject matter is not limited in these respects.

In one example, the server type computing device service provider 210 may provide the summary representation of the article about the social event responsive to a received indication of a search query. For the example of the demonstration in France, responsive to a received search query for "demonstration" via a search engine, the server type computing device service provider 210 may provide the summary representation of the article about the demonstration in France. For the example of the international chess tournament, responsive to a received search query for "chess tournament", the server type computing device service provider 210 may provide the summary representation of the article about the international chess tournament.

In another non-limiting example, the server type computing device service provider 210 may provide the summary representation of the article about the social event responsive to a received request to upload the web page. For the example of the demonstration in some country, responsive to a received request to upload the web page of social networking service 208, the server type computing device service provider 210 may facilitate to provide the summary representation of the article about the demonstration in France, and this may be due in part to stored user preferences associated with the social networking service 208 (e.g., user preferences for social conscience related activities). For the example of the international chess tournament, responsive to a received request to upload the web page of social networking service 208, the server type computing device service provider 210 may provide the summary representation of the article about international chess tournament, and this may also be due in part to stored user preferences associated with the social networking service 208 (e.g., user preferences for chess related actives).

In FIG. 2, three client type computing devices 202, 204, and 206 may be shown, but it should be appreciated by those skilled in the art that the number and types of client type computing devices may be any number, and accordingly, the claimed subject matter is not limited in these respects. Additionally, shown in FIG. 2, the social networking service 208 and the server type computing device service provider 210 may be in separate location, but as alluded to previously, the social networking service 208 and the server type computing device service provider 210 may be a part and/or parts of a ubiquitous communication system such as, but not limited to, cloud computing type systems, where the location of the individual components of computing type device may not be important, and accordingly, the claimed subject matter is not limited in these respects.

It should be appreciated by those skilled in the art, that in order to not obscure the disclosed subject matter and to facilitate understanding of the disclosed subject matter, the communication systems 100 and 200, the client devices 102, the server type computing device 110, the client type computing devices 202, 204, and 206, the social networking service 208, and the server type computing device service provider 210 (shown in FIGS. 1 and 2) and their respective components may be illustrated as functional blocks. That is, it is contemplated that the communication systems 100 and 200, the client devices 102, the server type computing device 110, the client type computing devices 202, 204, and 206, the social networking service 208, and the server type computing device service provider 210 may be implemented in a wide variety of manners within the scope of the claimed subject matter, and accordingly, the disclosed subject matter is not limited in these respects.

Figure 3:
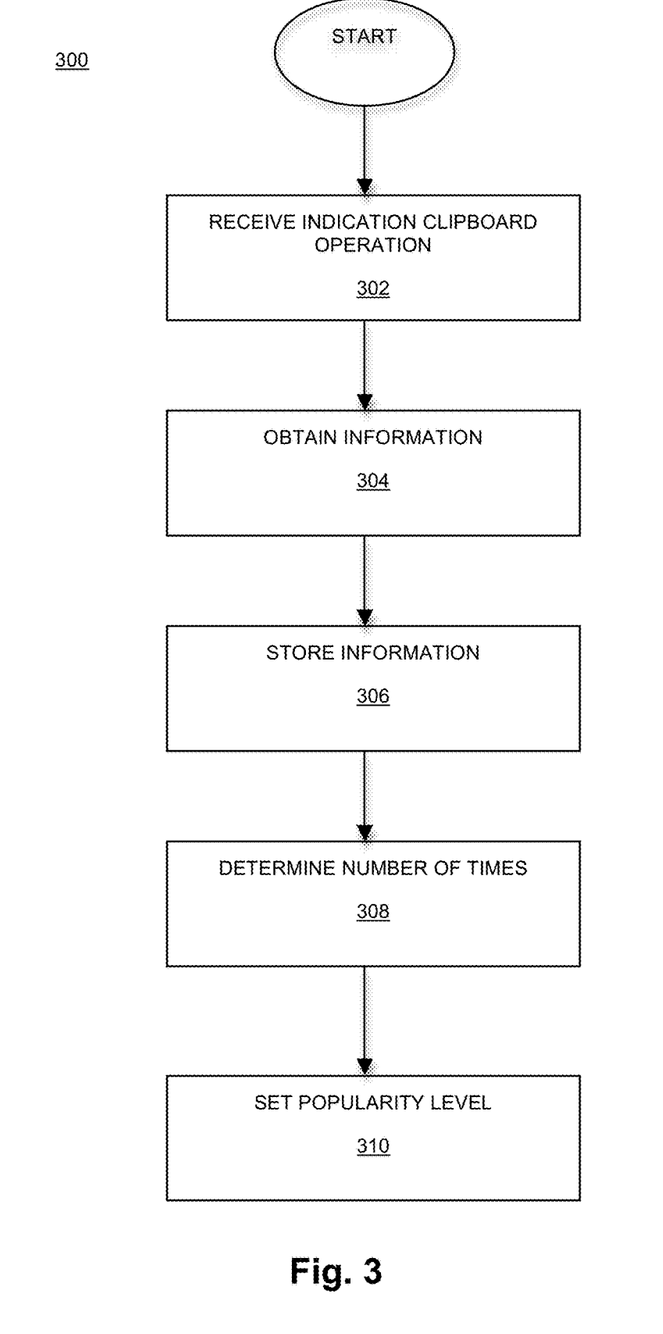
FIG. 3 illustrates an example process for facilitating distilling popular information of a web page, arranged in accordance with at least some embodiments described herein.

FIG. 3 illustrates an example process 300 for facilitating distilling popular information of a web page, arranged in accordance with at least some embodiments described herein. In the illustrated example, the process 300 may include one or more functional operations as indicated by example operations 302, 304, 306, 308, and/or 310.

As illustrated, the process 300 may be implemented for distilling popular information of a web page. Processing may begin at an operation 302, "RECEIVE INDICATION CLIPBOARD OPERATION", where an indication of a clipboard operation on a web page may be received at a computing device. For example, the computing device may be the server type computing device 110 or the server type computing device service provider 210 (shown in FIGS. 1 and 2) communicatively coupled to the internet 108. Additionally, the indication of the clipboard operation may be received from the client device 102 or the client type computing devices 202, 204, and 206 also communicatively coupled to the internet 108.

The processing may continue from the operation 302 to an operation 304, "OBTAIN INFORMATION", where responsive to the received indication, the computing device may obtain information corresponding to data stored as content of the clipboard operation. For example, the information may indicate a type of information that was stored as a result of the clipboard operation (e.g., a link to the web page having the article, a portion of text of the article, an image related to the article, full text of the article, and so forth). Additionally, the obtained information may also include a URL to indicate at least a source of a web page.

The processing may continue from operation 304 to an operation 306, "STORE INFORMATION", where the obtained information may be stored in some storage medium such as, but not limited to, the storage medium 119 in FIG. 1.

The processing may continue from operation 306 to an operation 308, "DETERMINE NUMBER OF TIMES", where a number of times the obtained information is stored is determined. The number of times may be any number and may be based, at least in part, on viewer related factors, as previously described.

The processing may continue from operation 308 to an operation 310, "SET POPULARITY LEVEL", where based, at least in part, on the determined number of times the obtained information is stored, a popularity level for the obtained information may be set. In one example, the popularity level may be set such that a summary representation may be generated for the obtained information, and accordingly, the summary information may be available to be presented for viewing. As a result, distilling of popular information of a web page may be facilitated.

It should be appreciated that the above described process 300 may be implemented in a wide variety of manners such as, but not limited to, the various embodiments of the present disclosure and variations thereof.

Figure 4:
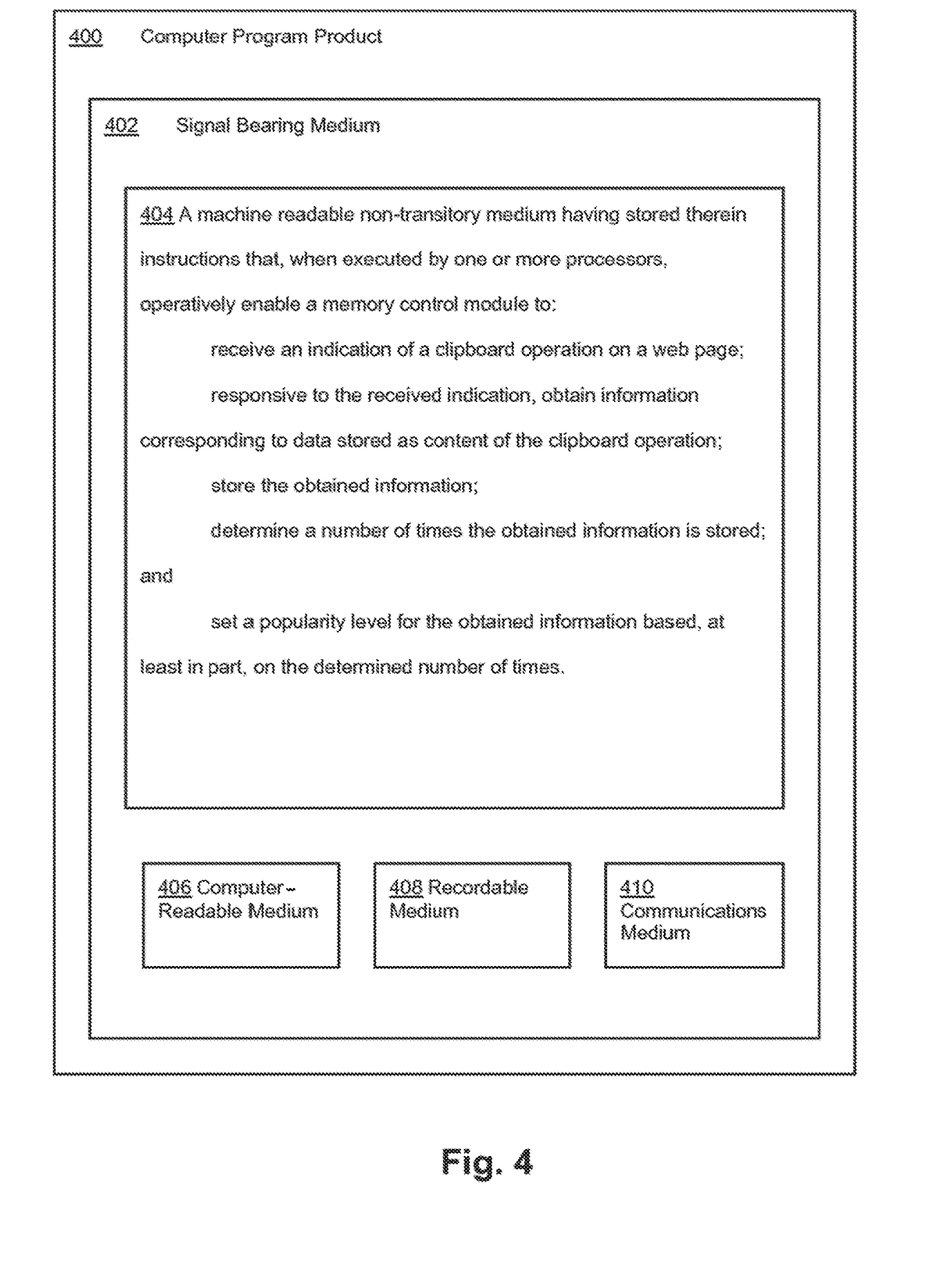
FIG. 4 illustrates an example computer program product that is arranged in accordance with at least some embodiments described herein.

FIG. 4 illustrates an example computer program product 400 that is arranged in accordance with at least some embodiments described herein. The computer program product 400 may include a signal bearing medium 402. The signal bearing medium 402 may include a machine readable non-transitory medium having stored therein instructions 404 that, if executed by one or more processors, may operatively enable a computing device to provide the functionality described above with respect to FIG. 3. Thus, for example, the server type computing device 110 and the server type computing device service provider 210 (shown in FIGS. 1 and 2) may undertake one or more of the actions shown in FIG. 3 in response to the execution of the instructions 404 conveyed by the signal bearing medium 402.

In some implementations, the signal bearing medium 402 may encompass a non-transitory computer-readable medium 406, such as, but not limited to, a hard disk drive, a Compact Disc (CD), a Digital Versatile Disk (DVD), a digital tape, memory, etc. In some implementations, the signal bearing medium 402 may encompass a recordable medium 408, such as, but not limited to, memory, read/write (R/W) CDs, R/W DVDs, etc. In some implementations, the signal bearing medium 402 may encompass a communications medium 410, such as, but not limited to, a digital and/or an analog communication medium (e.g., a fiber optic cable, a waveguide, a wired communications link, a wireless communication link, etc.).

Figure 5:
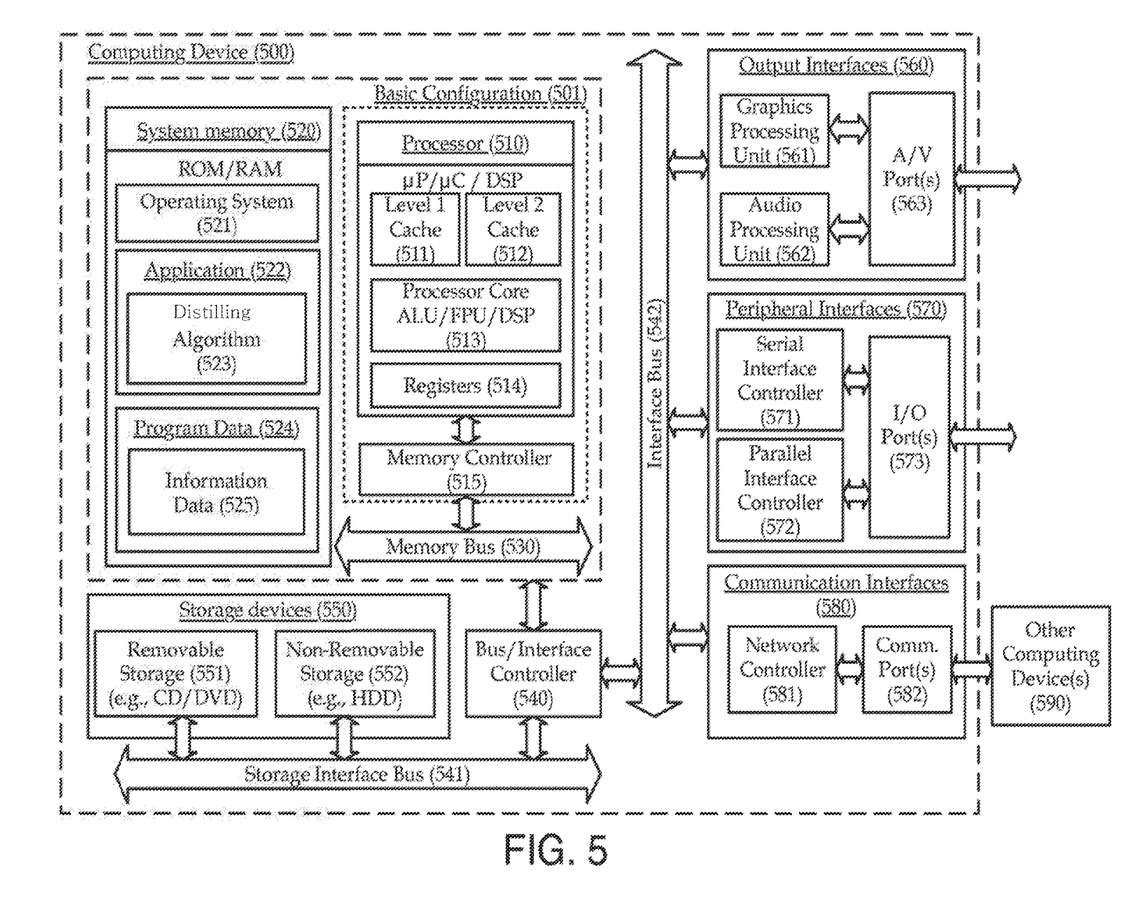
FIG. 5 is a block diagram illustrating an example computing device, such as might be embodied by a person skilled in the art, which is arranged in accordance with at least some embodiments described herein.

FIG. 5 is a block diagram illustrating an example computing device 500, such as might be embodied by a person skilled in the art, which is arranged in accordance with at least some embodiments described herein. In one example of a basic configuration 501, the computing device 500 may include one or more processors 510 and a system memory 520. A memory bus 530 may be used for communicating between the one or more processor 510 and the system memory 520.

Depending on the desired configuration, the one or more processor 510 may be of any type including but not limited to a microprocessor (µP), a microcontroller (µC), a digital signal processor (DSP), or any combination thereof. The one or more processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 may also be used with the one or more processor 510, or in some implementations the memory controller 515 may be an internal part of the one or more processor 510.

Depending on the desired configuration, the system memory 520 may be of any type including but not limited to volatile memory (such as RAM), non-volatile memory (such as ROM, flash memory, etc.) or any combination thereof. The system memory 520 may include an operating system 521, one or more applications 522, and program data 524. The one or more applications 522 may include distilling algorithm 523 for distilling popular information of a web page, the one or more applications 522 may be arranged to perform the functions as described herein including the functional blocks and/or actions described with respect to the process 300 of FIG. 3. The program data 524 may include obtained information data 525 for use with the distilling algorithm 523 for distilling popular information of a web page. In some example embodiments, the one or more applications 522 may be arranged to operate with program data 524 on the operating system 521 such that implementations of distilling popular information of a web page may be provided as described herein. For example, the client device 102, the server type computing device 110, the client type computing devices 202, 204, and 206, the social networking service 208, and the server type computing device service provider 210 (shown in FIGS. 1 and 2) may comprise all or a portion of the computing device 500 and may be capable of performing all or a portion of the one or more applications 522 such that implementations of distilling popular information of a web page may be provided as described herein. This described basic configuration 501 is illustrated in FIG. 5 by those components within dashed line.

The computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The one or more data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 520, the removable storage devices 551 and the non-removable storage devices 552 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be a part of the computing device 500.

The computing device 500 may also include an interface bus 542 for facilitating communication from various interface devices (e.g., output interfaces, peripheral interfaces, and communication interfaces) with the basic configuration 501 via the bus/interface controller 540. Example output interfaces 570 may include a graphics processing unit 561 and an audio processing unit 562, which may be configured to communicate to various external devices such as a display or speakers via one or more NV ports 563. Example peripheral interfaces 560 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that may include any of the above functions. The computing device 500 may also be implemented as a personal computer including both laptop computer and non-laptop computer configurations. In addition, the computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to distill popular parts of a web page, the method comprising:
  receiving, by a computing device, an indication that a clipboard operation has occurred on the web page, wherein the clipboard operation comprises at least one remote device copying at least some information from the web page, the copied information being stored on the at least one remote device;

obtaining, by the computing device, information corresponding to the clipboard operation, the information corresponding to the clipboard operation including a type of the copied information stored on the at least one remote device;

determining, by the computing device, a count of a number of times the information corresponding to the clipboard operation is obtained;

setting, by the computing device, a popularity level for the copied information based, at least in part, on the determined count of the number of times the information corresponding to the clipboard operation is obtained; and responsive to a determination that the popularity level meets a predetermined threshold number, generating a summary representation of the web page based on the copied information.

2. The method of claim 1, further comprising:
receiving a request for the web page; and
providing the summary representation.

3. The method of claim 2, wherein receiving the request comprises receiving an indication of a search query.

4. The method of claim 2, wherein receiving the request comprises receiving a request to upload the web page.

5. The method of claim 2, wherein receiving the request comprises receiving an indication of sharing a link to the web page.

6. The method of claim 1, wherein the type of the copied information includes a link to the web page, a portion of text of an article in the web page, an image related to the article, or full text of the article.

7. The method of claim 1, wherein the information corresponding to the clipboard operation further includes a uniform resource locator (URL) of the web page.

8. The method of claim 1, wherein the computing device includes a single server type computing device, a server rack with one or more server type computing devices, a server farm, or a cloud computing device, and the at least one remote device includes a laptop computer, a desktop computer, a mobile phone, a smart phone, or a server.

9. A non-transitory computer readable medium having instructions stored therein that, when executed by one or more processors, operatively enable a computing device to:
receive an indication that a clipboard operation has been performed on a web page, wherein the clipboard operation comprises at least one remote device copying at least some information from the web page, the copied information being stored on the at least one remote device;

obtain information corresponding to the clipboard operation including a type of the copied information stored on the at least one remote device;

determine a count of a number of times the information corresponding to the clipboard operation is obtained;

set a popularity level for the copied information based, at least in part, on the determined count of the number of times the information corresponding to the clipboard operation is obtained; and responsive to a determination that the popularity level meets a predetermined threshold number, generate a summary representation of the web page based on the copied information.

10. The non-transitory computer readable medium of claim 9, wherein the stored instructions further enable the computing device to:
receive a request for the web page, and
provide the summary representation.

11. The non-transitory computer readable medium of claim 10, wherein the request comprises a search query.

12. The non-transitory computer readable medium of claim 10, wherein the request comprises a request to upload the web page.

13. The non-transitory computer readable medium of claim 10, wherein the request comprises an indication of sharing a link to the web page.

14. The non-transitory computer readable medium of claim 9, wherein the type of the copied information includes a link to the web page, a portion of text of an article in the web page, an image related to the article, or full text of the article.

15. The non-transitory computer readable medium of claim 9, wherein the information corresponding to the clipboard operation further includes a uniform resource locator (URL) of the web page.

16. A computing system comprising:
a processor; and
a non-transitory computer readable medium communicatively coupled to the processor, the non-transitory computer readable medium having instructions stored therein that, when executed by the processor, cause the computing system to:
receive an indication that a clipboard operation has been performed on a web page, wherein the clipboard operation comprises at least one remote device copying at least some information from the web page, the copied information being stored on the at least one remote device, obtain information corresponding to the clipboard operation including a type of the copied information stored on the at least one remote device, determine a count of a number of times the information corresponding to the clipboard operation is obtained, set a popularity level for the copied information based, at least in part, on the determined count of the number of times the information corresponding to the clipboard operation is obtained, and responsive to a determination that the popularity level meets a predetermined threshold number, generate a summary representation of the web page based on the copied information.

17. The computing system of claim 16, wherein the stored instructions further enable the computing system to:
receive a request for the web page, and
provide the summary representation.

18. The computing system of claim 17, wherein the request comprises a search query.

19. The computing system of claim 17, wherein the request comprises a request to upload the web page.

20. The computing system of claim 17, wherein the request comprises an indication of sharing a link to the web page.

21. The computing system of claim 16, wherein the type of the copied information includes a link to the web page, a portion of text of an article in the web page, an image related to the article, or full text of the article.

22. The computing system of claim 16, wherein the information corresponding to the clipboard operation further includes a uniform resource locator (URL) of the web page.

* * * * *

UNITED STATES PATENT AND TRADEMARK OFFICE
CERTIFICATE OF CORRECTION

PATENT NO. : 9,558,292 B2
APPLICATION NO. : 13/577411
DATED : January 31, 2017
INVENTOR(S) : Kim It is certified that error appears in the above-identified patent and that said Letters Patent is hereby corrected as shown below:

In the Specification

In Column 10, Lines 48-49, delete "output interfaces 570" and insert -- output interfaces 560 --, therefor.

In Column 10, Line 52, delete "NV ports" and insert -- A/V ports --, therefor.

In Column 10, Lines 52-53, delete "peripheral interface 560" and insert -- peripheral interface 570 --, therefor.

Signed and Sealed this
Nineteenth Day of June, 2018

Andrei Iancu
*Director of the United States Patent and Trademark Office*